UNITED STATES PATENT OFFICE.

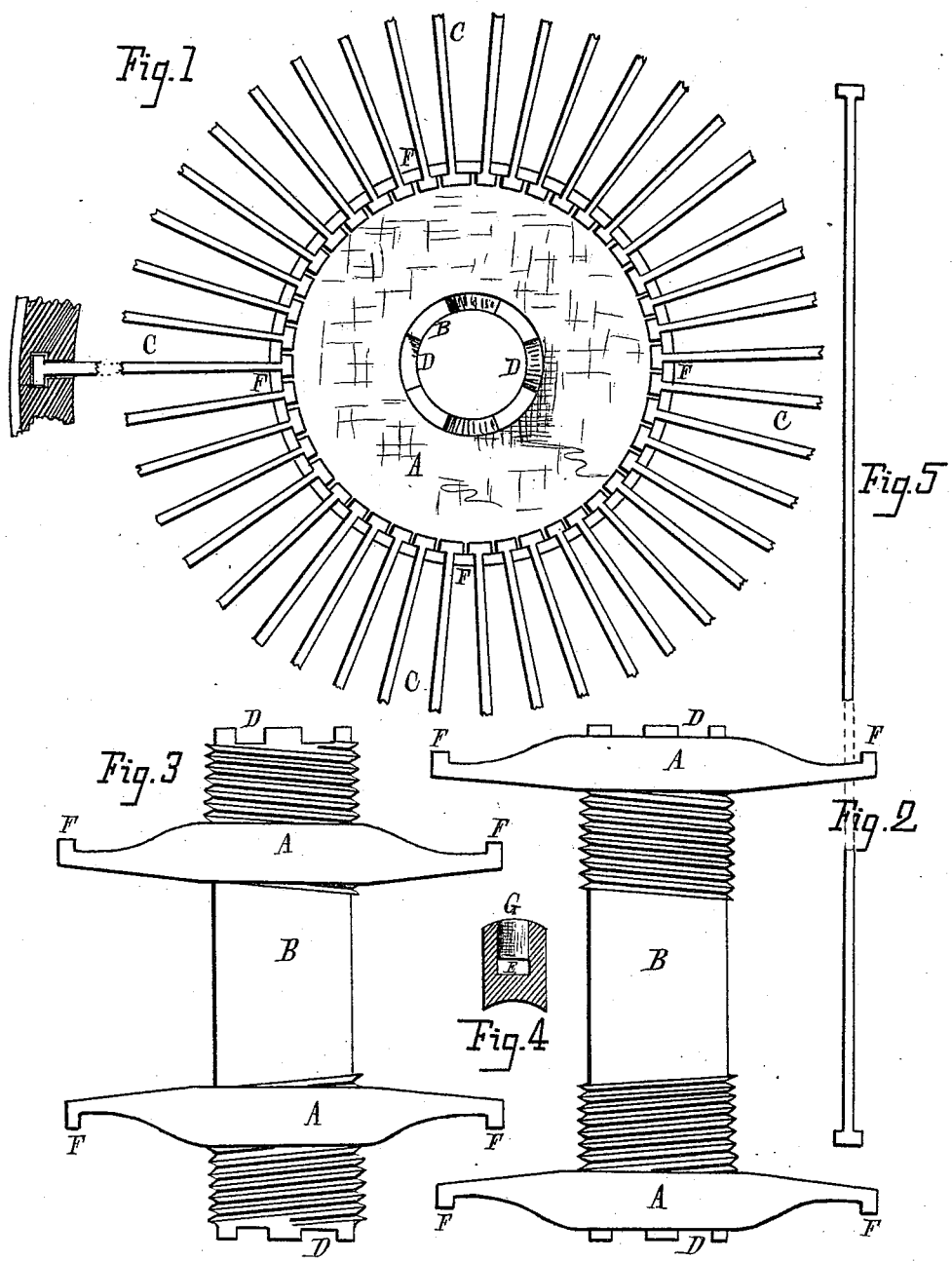

ARSENE CARPENTIER, OF CAUDRY, FRANCE.

VELOCIPEDE-WHEEL.

SPECIFICATION forming part of Letters Patent No. 434,041, dated August 12, 1890.

Application filed March 26, 1890. Serial No. 345,339. (No model.) Patented in France January 21, 1890, No. 203,295, and in England February 18, 1890, No. 2,601.

*To all whom it may concern:*

Be it known that I, ARSENE CARPENTIER, a citizen of the French Republic, and a resident of Caudry, in the Department of the Nord, France, have invented certain new and useful Improvements in Velocipede-Wheels, of which the following is a specification; and for which I have obtained Letters Patent in France, No. 203,295, dated January 21, 1890, and in Great Britain, No. 2,601, dated February 18, 1890.

This invention relates to the construction of wheels such as and similar to those which are employed for velocipedes; and it has for its object to secure a simplification in the construction and of the details, and consequently an economy in the manufacture.

According to these improvements the spokes are stamped out of suitable metal with a T-head at each end. The hub of the wheel consists of two disks having a circumferential notched projection on the outer side of each disk and a central tube. The tube is screwed at one end with a right-hand and at the other with a left-hand screw-thread, and the disks are respectively bored and screwed through the eyes with internal threads to fit upon the opposite ends of the tube. In the inner circumference of the tire there are as many openings as there are to be spokes in the wheel, and these openings have a width transverse to the plane of the wheel sufficient only to admit the heads in the direction of the same plane. Above these slits, through which the ends of the spokes are inserted, the openings in the tire are enlarged, so as to enable the heads to be turned therein and to rest across the sides of the slits. There are on each of the disks half as many of the radial notches as there are spokes in the wheel, and the inner T ends of the spokes are engaged in these notches, the odd spokes engaging with one of the disks and the even spokes with the other. The spokes of each wheel are of uniform length, and they can be inserted in the notches of the disks only when these are screwed toward the center of the tube. When all the spokes have been inserted, the disks are separated by rotating the tube, and thus the spokes are stretched between the hub and the tire and are securely held.

I will proceed to more particularly describe my invention with reference to the accompanying sheet of drawings, in each of the figures of which similar parts where they are represented are indicated by similar letters of reference.

Figure 1 is an elevation of the hub, showing the spokes attached thereto. Fig. 2 is a sectional elevation of the hub with the disks separated to their full extent, as when the wheel is fully constructed. Fig. 3 is a sectional elevation of the hub with the disks approached in the position for inserting the spokes. Fig. 4 is a section of a tire, and Fig. 5 is a plan of a spoke with a portion of its middle length broken away.

A A are the disks, which are bored and internally screwed to fit upon the opposite ends of the central tube B, the ends being screwed, respectively, with a right-hand and a left-hand thread, as indicated in Figs. 2 and 3. The ends of the tube B are provided with radial notches D, by means of which the tube may be turned by a suitable key, or even by a plain rod of iron, when desired. The periphery F of each of the disks A is cut with a series of equidistant radial notches equal in number to one-half of the total number of the spokes in the wheel, as represented in Fig. 1. In the inner side of the tire there are formed a number of narrow slits G just wide enough for the insertion of the T-head of the spokes when the length of the T-head is transverse to the plane of the wheel. Above the slits G the openings are enlarged, as at E, Fig. 4, so as to permit the head of the spoke to be turned therein. When the head of the spoke has thus been turned through an angle of ninety degrees, it will rest upon and be supported by the walls of the slit G, so that it cannot be withdrawn by an ordinary direct pull. The slits or notches in the projecting parts F F of the disks A A have such a width only as will permit the stems of the spokes to be inserted therein comfortably.

Each of the spokes C C intended for use in the same wheel is stamped out of metal or otherwise produced to exactly equal lengths with parallel T-heads at the ends, as shown in Fig. 5.

In constructing the wheel the disks A A are screwed upon the tube B to an equal distance from the ends, as shown in Fig. 3. One of the T ends of each of the spokes is then inserted in one of the slits G of the tire and turned at a right angle. The inner ends of the spokes are then inserted into the radial notches in F F, alternate spoke ends being inserted in alternate disks when the spokes occupy the positions in the hub represented in Fig. 1. All the spokes being thus engaged by their T ends with the tire and with the hub respectively, the tube B is rotated and the disks B B are therefore separated. By the separation of the disks the distance between the parts F F and the tire is increased, and the spokes are consequently held firmly by tension between the tire and the disks.

If it is desired to avoid the risk of the possible movement of the disks A A while the wheel is in use, these may be secured upon the tube by means of rings, set-screws, or other known and suitable devices.

The ends of the spokes have for convenience been described as having parallel T ends; but it is obvious that the shape of the enlarged ends of the spokes may be equivalent thereto without being precisely T-shaped. Particularly that end of the spoke which is destined to be inserted in the notched peripheriphery F of the hub may be button-shaped, or be otherwise formed with an enlarged end.

Having now particularly described and ascertained the nature of my said invention and in what manner the same is to be performed, I declare that what I claim is—

The combination, with the tube B, having right and left hand screw-threaded ends and radial notches D, of the disks A, bored and screw-threaded to fit the ends of the tube B, the periphery F of each disk having a series of radial notches, a tire having a series of T-shaped narrow slits, and a series of spokes, each having parallel T-heads at its ends adapted to be received in the narrow T-shaped slits in the tire and in the radial notches in the disks, whereby the spokes can be inserted into the tire, rotated a quarter-turn to engage their heads with the T-shaped slit engaged with the notches in the disk, and tightened by rotating the tube B by means of a wrench applied to the notches D, substantially as described.

In testimony that I claim the foregoing as my invention I have signed my name in presence of two witnesses.

ARSENE CARPENTIER.

Witnesses:
LOUIS BREICOUT,
C. V. BRETER.